455-609
FIP8106   AU 233   EX
XR   3,730,979

United States Patent [19]
Schwarz et al.

[11] 3,730,979
[45] May 1, 1973

[54] METHOD AND MEANS FOR PARTICLE AND LIGHT WAVE INTERACTION

[76] Inventors: Helmut J. Schwarz, 49 Carver Circle, Simsbury, Conn.; Heinrich W. Hora, Rotdornweg 4, 8012 Ottobrunn Bie Munich, Germany

[22] Filed: Dec. 7, 1970
[21] Appl. No.: 95,777

[52] U.S. Cl. ................ 178/5.4 R, 315/4, 331/94.5 A, 350/147
[51] Int. Cl. .............................................. H04n 9/22
[58] Field of Search .................. 250/199; 350/160 R; 315/3, 4

[56] References Cited

UNITED STATES PATENTS 3,267,383   8/1966   Lohmann ................................. 315/3
3,231,779   1/1966   White ..................................... 315/4

Primary Examiner—Robert L. Griffin
Assistant Examiner—George G. Stellar
Attorney—Robert S. Dunham, P. E. Henninger, Lester W. Clark, Gerald W. Griffin, Henry T. Burke, Thomas F. Moran, Howard J. Churchill, R. Bradlee Boal, Christopher C. Dunham and Thomas P. Dowd

[57] ABSTRACT

Method and means for creating an interaction between a beam of particles and electromagnetic waves, particularly at optical frequencies, wherein a high velocity beam of particles, such as electrons, is passed through a suitable interaction zone, for example, in the form of an optically transparent dielectric target, such as a thin crystalline film, while the target is irradiated with laser light polarized generally in the direction of travel of the particles, whereby the particles upon striking a suitable medium, such as a non-luminescent screen, give off light of the same color as the laser, which becomes visible on the screen. The interaction thus derived can be used in many particular applications such as, for example, in a color television tube and other electronic display or information storage devices.

25 Claims, 4 Drawing Figures

INVENTORS
HELMUT J. SCHWARZ
HEINRICH W. HORA
BY Thomas P. Dowd
Thomas F. Moran
ATTORNEY

METHOD AND MEANS FOR PARTICLE AND LIGHT WAVE INTERACTION

BACKGROUND OF THE INVENTION

The present invention relates generally to the field of electromagnetic wave interaction and more particularly to a method and means for producing an interaction between a beam of particles and electromagnetic waves, particularly at optical frequencies.

The use of various electronic devices to produce an interaction between electromagnetic waves in the lower frequency portion of the electromagnetic spectrum is long-established and well known in the art and is widely applied in such fields as AM, FM and television broadcasting and various radar and microwave applications. Also, the interaction of high frequency electromagnetic waves and particle waves has been observed, such as in the diffraction of x-rays by a crystal lattice, the lattice being regarded as a standing particle wave. However, although P. L. Kapitza and P.A.M. Dirac suggested as early as 1933 in the Proceedings of the Cambridge Philosophical Society, that, conversely, high frequency electromagnetic waves should act as a diffraction grid for a particle wave, it was not until 1965 after development of the laser, that such an interaction was experimentally observed and reported by Schwarz et al. in PHYSICS LETTERS 19,202 (1965) wherein an electron beam was diffracted by a standing electromagnetic wave. This further confirmation of particle-wave duality led the inventors to the consideration of whether particle waves, such as an electron beam, might also be interacted with traveling electromagnetic waves, such as a laser beam, to achieve momentum transfer.

This interaction was a heretofore unobserved phenomenon. Utilizing the method and means of the present invention, such as interaction between a particle wave and a traveling electromagnetic wave has been achieved, thus permitting the application of this phenomenon to a vast number of electronic and optical devices.

SUMMARY OF THE INVENTION

The present invention involves a method and means for interacting a beam of particles with electromagnetic waves, particularly at optical frequencies, and essentially comprises the passing of a high velocity beam of particles through a suitable interaction zone, such as an optically transparent dielectric target in the form of a thin crystal, while irradiating the target with a beam of electromagnetic radiation, which is preferably coherent, that is, a laser beam, and whose electrical vector is polarized generally in the direction of propagation of the particle beam. If the particle beam after interacting with the laser beam is then permitted to fall on a non-luminescent medium such as an alumina screen, light of the same wavelength as that of the laser beam will be given off and become visible on the screen. This interaction phenomenon is apparently brought about by the presence in the interaction zone of an appropriate target material which lowers the speed of light in the zone allowing momentum transfer among the particles, the radiation and the material, as will be more fully described.

The interaction may be applied in a wide range of electrical devices, such as in the areas of broadcasting, communications, information storage, data processing and the like and may be particularly embodied, for example, in a color television tube, or similar display apparatus, as will be described.

DETAILED DESCRIPTION OF A PREFERRED EMBODIMENT

The present invention will first be described in connection with a basic system which may be used for achieving the interaction phenomenon and then in terms of a particular embodiment as incorporated in a color television tube. The term "electromagnetic radiation" as used herein shall refer to energy transmitted through space and through a material medium in the form of electromagnetic waves and the term "particle" shall refer to those elementary particles having non-zero rest mass.

Figure 1:
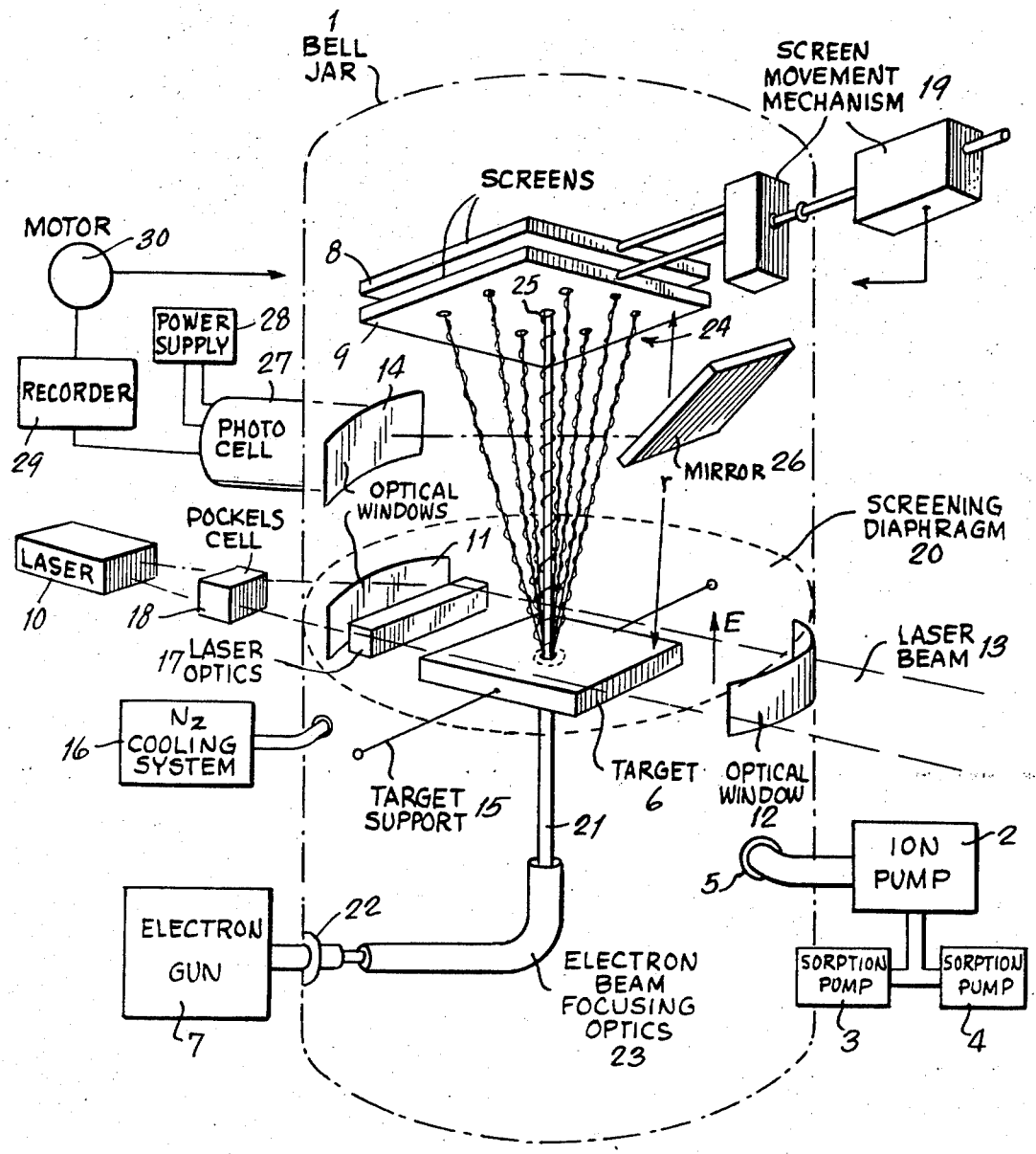
FIG. 1 is a diagrammatic representation of a system for interacting a high velocity electron beam with electromagnetic radiation at optical frequencies in accordance with the present invention.

The phenomenon can be accomplished using a system such as shown diagrammatically in FIG. 1, wherein an ultra-high vacuum chamber is used to surround the interaction zone. The chamber comprises a stainless steel bell jar 1 which is evacuated by an ion pump 2, backed up by two sorption pumps 3 and 4. A 140 liter/sec. VacIon pump obtainable from Varian Associates, Palo Alto, California, has been found to be suitable for this purpose and any appropriate liquid nitrogen sorption pumps may be used as forepumps. The ion pump 2 is attached to the bell jar 1 by suitable copper gasket seals 5 to permit baking out, and the system, for best results, should be evacuated to produce a completely "dry" vacuum in the order of $10^{-10}$ torr and lower.

The interaction zone in this system is in the form of an optically transparent, dielectric target 6 disposed in the chamber between a means for producing a high velocity beam of particles, such as an electron gun 7, and a means for intercepting the particle beam after passing through the target, such as a fluorescent screen 8 or non-luminescent screen 9. The means for producing the electromagnetic waves is a laser 10, and optically flat windows 11 and 12 are provided in the bell jar 1 for the passage of the laser beam 13. Another optically flat window 14 may be provided for observing the detector screens 8 and 9.

The target 6, more particularly, is a thin film crystal such as of silicon dioxide ($SiO_2$), aluminum oxide ($Al_2O_3$) or strontium fluoride ($SrF_2$). The thickness of the crystal may be of the order of 1,000 Angstroms, depending upon the wavelength of the laser light used, which in the present system may be blue light of 4,880 Angstrom wavelength. The target 6 is mounted in the chamber such as by means of a tungsten wire grid with a portion of the grid supporting about 1 × 1 millimeter squares of the crystalline film by opposed wires 15 which leave opposite edges of the film unobstructed to permit the laser beam 13 to shine through these edges parallel to the film surface. To avoid any slight impurities in the film, which might lead to excessive heat absorption from the relatively high intensity laser beam, the crystalline film should be carefully prepared such as by epitaxial vacuum-deposition in a separate vacuum system of about $10^{-10}$ torr. The deposited film may be floated off its substrate under de-ionized water and caught with the special tungsten wire grid. A small liquid nitrogen cooling system 16 can be used to moderate the temperature of the film support during laser irradiation.

The interaction zone, as will be more fully explained, may be provided in various ways, and many different substances and materials will be found suitable, whether amorphous, monocrystalline or polycrystalline, or in the gaseous, liquid or solid state, as long as they possess the proper light-velocity-decreasing properties and dimensions, are transparent to the electromagnetic radiation at the interacting frequency, and tend to minimize particle scattering.

The irradiating laser beam 13 is directed through the optically flat window 11 in the bell jar 1, passes through the crystalline film target 6 and out of the bell jar 1 through the similar window 12 on the opposite side. Laser optics, such as a suitable system of optical lenses 17 may be arranged inside the jar adjacent the window 11 to constrict the beam to a diameter of about 10 to 50 micrometers. To study variations in the phenomenon, the laser 10 should be arranged so that the direction of its electrical vector E may be changed by rotating the laser 10 itself or by means of a Pockels cell 18 positioned in the path of the laser beam 13 before it enters the bell jar 1. A suitable laser for use with this system is a 10-watt argon ion laser with Brewster angle which produces, as noted previously, a beam of blue light with a wavelength of 4,880 Angstroms. However, laser beams of various colors or wavelengths may be used.

The detector screen, as previously noted, may be of a fluorescent or a non-luminescent material. For observational purposes, interchangeable screens of each type can be used, which are also adapted to be variably spaced with respect to the target so that the phenomenon may be fully observed. In such a case, an appropriate feed-through screen movement system 19 is provided so that, for example, the non-luminescent screen 9 can be moved transversely to cover and uncover the fluorescent screen 8 during the observation of the phenomenon. The latter screen 8 may be a conventional zinc sulphide fluorescent screen, while the non-luminescent screen 9 may be of any convenient material, such as quartz or glass, but many substances will be found suitable, depending upon the particular effects which are desired to be obtained. A non-luminescent screen consisting of a polycrystalline smooth alumina disc of 1 inch diameter, such as normally used for microelectronic thin film circuitry, has been found to be particularly suitable. The screen movement system may consist of magnetic as well as mechanical operators and in addition to transversely displacing screen 9 should also be adapted to vary the distance between the screens and the target to observe phenomenon dependence on this spacing.

The screen side of the target 6 in the present system is covered by a thin metal diaphragm 20, such as a sheet of tantalum, which extends across the entire cross-section of the chamber and has a small opening or hole of about 50 micrometers diameter at the crystal to permit the passage of the electron beam 21. This tantalum sheet shields the screens 8 and 9 from scattered laser light and any light emitted by the hot cathode of the electron gun 7.

To further shield the screens from the hot cathode of the electron gun 7, the crystal target 6 with its grid support 15 may be positioned in the horizontal orientation and the electron gun 7 then attached to the bell jar 1 horizontally with a Varian type flange 22 using a copper gasket. Suitable focusing optics 23, such as magnetic and electrostatic lenses and several diaphragms, may be used to shape the beam 21 which can then be bent into the vertical direction and passed through three more small apertures before traversing the thin crystal target 6. The electron beam 21 in the present system may be of about 0.5 microamp current and a few micrometers diameter and should be accelerated by a highly stabilized voltage of the order of 50 keV.

For proper operation of this described system, the following procedure should be followed to maximize the occurrence of the phenomenon. Before each experiment, the electron optics 23 should be adjusted so that the electron beam 21 passes perpendicularly through an area of the crystalline film target 6 to provide a good Laue pattern 24 which may be observed initially on the fluorescent screen 8. The alumina screen 9 may then be slid into position covering the fluorescent screen 8 completely and should be cleaned, such as by argon ion bombardment to avoid the occurrence of a purple fluorescence on the alumina screen 9. It may also be necessary to lower the vacuum below $10^{-9}$ torr to overcome this impurity problem and completely eliminate the purple fluorescence. The alumina screen 9 may then be observed through the optical window 14 and will appear blank with the possible exception of a very weak purple fluorescence at the center spot 25 of the diffraction pattern 24.

When the suitable electron beam 21 has been established, the laser beam 13 is turned on and directed to pass through the target 6, in one edge and out another.

A diffraction pattern whose light spots are of the same color as the laser light will appear on the non-fluorescent screen 9. It will be further observed that even though the laser beam 13 intersects the electron beam 21, if it does not do so while passing through the crystalline film target 6, the light spots 24 will disappear. Also, the brightness of the light spots may be varied by varying the direction of the electrical vector of the polarized laser light; the spots being brightest when the electrical vector lies parallel to the electron beam. The brightness may also be increased by increasing the electron current or the laser intensity. Removal of the non-luminescent screen 9 results in the production of a light pattern on the fluorescent screen whose color is a combination of the color of the laser light and the light of the screen phosphors.

The resulting light pattern may be recorded by suitable means outside the bell jar 1 by the positioning of a flat front mirror 26 inside the bell jar 1 at an angle to the screens 8 and 9 and to the observation window 14 in the side of the bell jar 1. A camera 27a as well as a photomultiplier tube 27 may be attached to the window 14. A suitable photomultiplier tube for use with the system described is the RCA type 6810A of 14 stages operated from a 2400 volt power supply 28. Using such a tube, the luminosity of the light spots 24 on the non-fluorescent screen 9 have been noted to be at least of the order of $10^{-10}$ watt.

Figure 2:
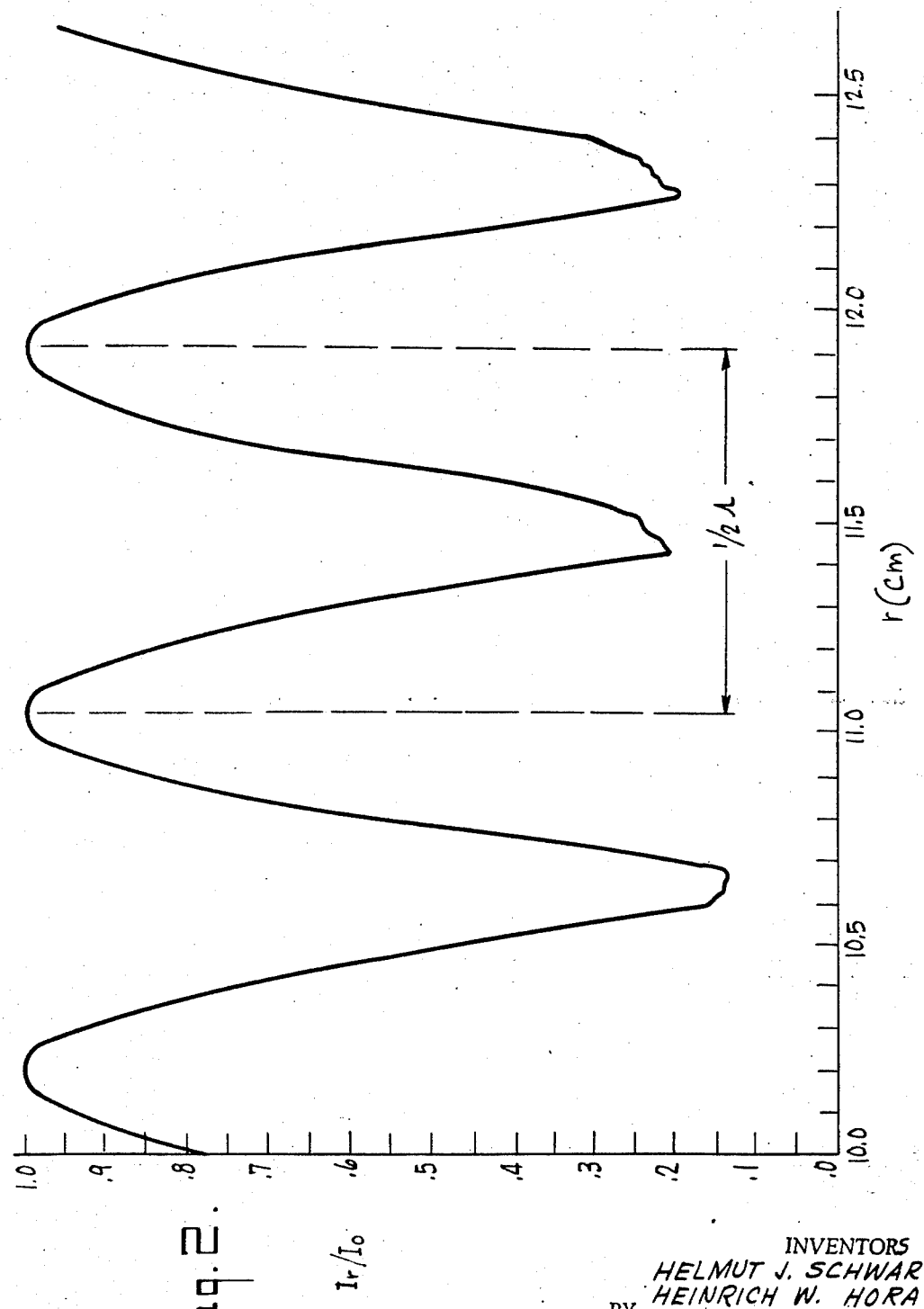
FIG. 2 is a plot obtained with the system of FIG. 1 representing the relative intensity ($I/I_0$) of blue light ($\lambda = 4480A$) given off at the non-luminescent screen as a function of the distance $r$ between the thin film target and the screen when the electrical vector of the laser is parallel to the direction of the electron beam.

To study the phenomenon further, the distance $r$ between the crystalline target 6 and the screen 8 and 9 may be varied by means of the screen movement mechanism 19. To observe any intensity variations, a suitable recorder 29 is connected to the photomultiplier tube 27 to register the luminosity of the non-fluorescent screen 9, and the motor 30 of the recorder 29 may be slowly driven synchronously with the screen movement mechanism 19. It will be observed that over a range of $r=10$ centimeters to $r=35$ centimeters, a periodic change of intensity occurs, while the intensity maxima remain substantially the same with slight variation. FIG. 2 illustrates a smoothed out copy of a section of such a recording made in the range from $r=10.0$ centimeters to $r=12.5$ centimeters. It will be noted that the maxima of the curve are essentially equally spaced by a value of ½Λ which is equal to 0.85 centimeters. This spacing will also be observed to increase somewhat with an increase of the electron energy, as well as with an increase in the wavelength of the light.

Figure 3:
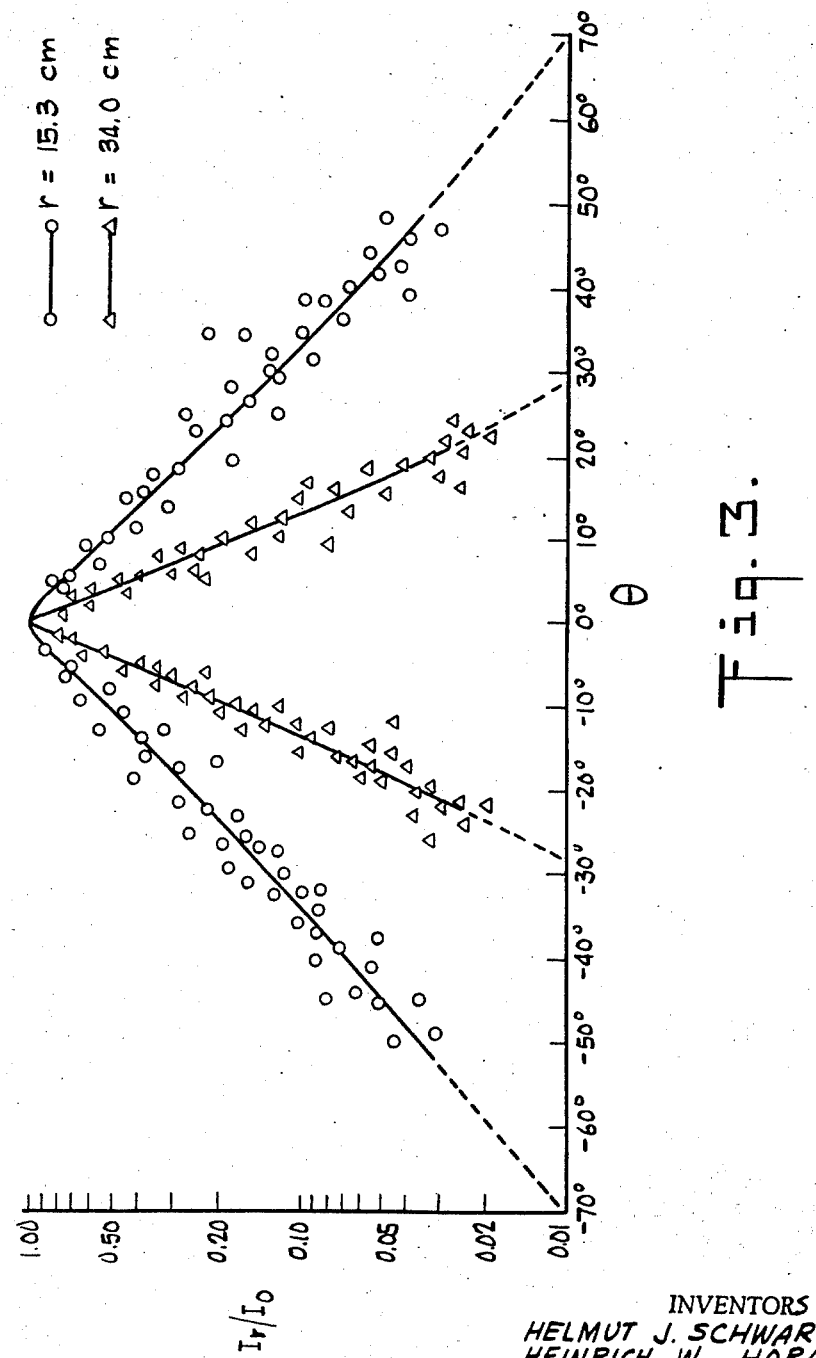
FIG. 3 is a plot obtained with the system of FIG. 1 representing the relative intensity ($I/I_0$) of blue light ($\lambda = 4480A$) given off at the non-luminescent screen as a function of the angle $\Theta$ between the electrical vector of the laser and the direction of the electron beam at distances $r=15.3$ centimeters and $r=34.0$ centimeters between the thin film target and the screen where maxima in accordance with the conditions of FIG. 2 occur.

If the direction of the electric vector E is varied, for example, by means of the Pockels cell 18, the maximum intensity of the light spots 24 on the non-luminescent screen 9 will occur when the electrical vector E is in the same direction as the electron beam 21. The intensity will decrease faster than linearly with the cosine of the angle $\theta$ between the direction of the electrical vector E and that of the electron beam 21. FIG. 3 illustrates several measurements performed with the photomultiplier tube 27 mentioned above, at distances of $r=15.3$ centimeters and $r=34.0$ centimeters between the target 6 and the screen 9, at which points maxima are observed in a plot in accordance with the conditions in FIG. 2. At these distances, the maxima of the light intensity I are substantially the same when $\theta$ equals zero, that is when the electrical vector E of the light is parallel to the electron beam 21, as was noted in FIG. 2. The ordinate of FIG. 3 indicates the fractional level of light intensity $I_r/I_o$ in relation to these maxima, while the abscissa is the angle $\theta$ between the electron beam 21 and the electrical vector E of the light. It will be noted that with increases in the distance $r$, the peaks of the maximum light intensity become sharper.

To verify the fact that the phenomenon occurs as a result of the interaction of the electron beam 21 and the laser light 13, a well-shielded magnet with a field of about 300 gauss may be introduced into the screen region and the color pattern 24 on the screen will be observed to be deflected accordingly. Also, when the laser beam 13 is turned off, no light will be observed on the non-luminescent screen, even though the electron beam remains on for a considerable period of time.

Perhaps a more thorough understanding of the present invention can be achieved if it is considered that the phenomenon may be treated quantum mechanically as a single electron process by assuming that the simple wave function, $$\Psi_o(E_o) = exp[i/\hbar(p \cdot r - E_o t)] \qquad (1)$$

will be transformed into a superposition of wave functions of plane waves separated by the energy $\hbar\omega$ of the photons, after the electron has passed through the dielectric target.

A closer analysis of the wave function in this form, $$\Psi = a_- \Psi_-(E_o - \omega\hbar) + a_o \Psi_o(E_o) + a_+ \Psi_+(E_o + \omega\hbar) \qquad (2)$$

provides an explanation of the observed periodicity and also why the presence of the dielectric target, or some other suitable means for creating an interaction zone, will contribute to the producing of the phenomenon. The wave function $\Psi$ in Equation (2) describes the superposition of three waves, one represented by unaffected electrons of energy $E_o$; a second represented by electrons of energy $E_o + \omega\hbar$, due to a photon being absorbed; and a third represented by electrons of energy $E_o - \omega\hbar$, due to the emission of a photon. The momentum of an electron which absorbs a photon will increase by a value $\Delta p_+$; and the momentum of an electron which emits a photon will decrease by a value $\Delta p_-$. Thus, the wave function $\Psi_+$ for electrons with energy $E_o + \omega\hbar$ is in the form:

$$\Psi_+ = e^{\frac{i}{\hbar}[(p+\Delta p_+) \cdot r - (E_o + \omega\hbar)t]} \qquad (3)$$

and the wave function $\Psi_-$ for electrons with energy $E_o - \omega\hbar$ is:

$$\Psi_- = e^{\frac{i}{\hbar}[(p-\Delta p_-) \cdot r - (E_o - \omega\hbar)t]} \qquad (4)$$

The relationships between the momenta and energy of the different states are:

$$p^2/(2m) = E_o \qquad (5)$$

$$(p \pm \Delta p_\pm)^2/2m = E_o \pm \omega\hbar \qquad (6,7)$$

Thus, Equations (1) to (4) lead to the wave function $$\Psi = \Psi_o \left[ a_0 + a_+ e^{\frac{i}{\hbar}(\Delta p_+ \cdot r - \omega\hbar t)} + a_- e^{-\frac{i}{\hbar}(\Delta p_- \cdot r - \omega\hbar t)} \right] \qquad (8)$$

For simplicity in the evaluation of this wave function, consider the case where the electrical vector of the laser is parallel to the direction of propagation of the electron beam so that the dot product signs in Equation (8) may be neglected.

The Equations (5) to (7) allow the determination of the momentum increase $\Delta p_+$ and the momentum decrease $\Delta p_-$ by:

$$\Delta p = \tfrac{1}{2} p(\epsilon \pm \tfrac{1}{4}\epsilon^2 + \ldots) \qquad (9)$$

where $\epsilon = (\omega\hbar/E_o)$ is the ratio of photon energy to electron energy and the electron energy is $E_o \cong (mv^2)/2$. For the values used in the particular system described, $\epsilon$ is approximately $5 \times 10^{-5}$, the photon energy being 2.54 eV and the electron energy being $5 \times 10$ eV. Therefore, the series of Equation (9) can be broken off after the second term. Equation (9) indicates that the presence of a third body or some medium for allowing momentum transfer is in order, since the maximum momentum transfer of a photon to an electron in the direction of the electron beam without it can only be $\hbar\omega/c$. The conservation of momentum in the electron beam direction can be expressed with Equation (9) by:

$$2(\hbar\omega)/c \cos\theta = p(\epsilon \pm \tfrac{1}{4}\epsilon^2 + \ldots) \qquad (10)$$

where $\theta$ is again the angle between momentum change and electron beam direction. Introducing $p = mv$ and $\epsilon = 2\hbar\omega/(mv^2)$ leads to the relationship when $\epsilon < 10^{-1}$:

$$V/C \cos\theta = 1 \pm \tfrac{1}{4}\epsilon \qquad (11)$$

which indicates that the momentum transfer in the described system will not take place in a vacuum, since in vacuum $V/C = 0.41$ and the value of $\tfrac{1}{4}\epsilon \cong 10^{-5}$. Therefore, it will be seen that the phenomenon may be produced using means for creating an interaction zone fulfilling the conditions indicated in Equation (11) that is, a medium for decreasing the speed of light in the zone to approximately that of the particle beam velocity. For example, as in the described system, a dielectric material can provide the conditions which will satisfy the relationship expressed in Equation (11), if placed in a vacuum and subjected to the electric field inhomogeneities due to the nonuniformity of the laser intensity, which is not an ideally parallel beam, and discontinuities at the boundaries between the dielectric and vacuum.

For the determination of the charge density fluctuations, $\psi^*\psi$ must be formed and Equation (9) introduced. The real part of $\Psi^*\Psi$ as a function of space and time will then be:

$$\Psi^*\Psi = A_0 + Za_0 a_+ \cos\left[\frac{\tfrac{1}{2}\left(\epsilon + \tfrac{1}{4}\epsilon^2\right)pr - \omega_-\hbar t}{\hbar}\right]$$

$$+ Za_0 a_- \cos\left[\frac{\tfrac{1}{2}\left(\epsilon - \tfrac{1}{4}\epsilon^2\right)pr\omega\hbar t}{\hbar}\right]$$

$$+ Za_+ a_- \cos\left[\frac{\epsilon pr - Z\omega\hbar t}{\hbar}\right] \qquad (12)$$

where $A_o = a_o^2 + a_+^2 + a_-^2$.
Equation (12) can be written as $$\Psi^*\Psi \approx A_o + A_1 \cos[\epsilon^2/(8\hbar)pr]\cos[\epsilon/(2\hbar)pr - \omega t] \quad (13)$$

where $$A_1 \approx 4a_0 a_+ \approx 4a_0 a_- \text{ and } A_1 >> a_+ a_- \qquad (14)$$

In view of this, it may be assumed that the probability for increasing the momentum of the electron by $\Delta p_+$ while absorbing a photon $\omega\hbar$ is almost the same as the probability for decreasing the momentum of the electron by $\Delta p_-$ while stimulating emission of a photon $\omega\hbar$. Also it may be assumed that the cross-section for photon absorption and emission of the electrons is small which means $(a_+/a_0) << 1$ and $(a_-/a_0) << 1$. Equation (13) can also be written as follows:

$$\Psi^*\Psi \approx A_0 + A_1 \cos\left(\frac{2\pi}{\Lambda}r\right)\cos\left[\omega\left(\frac{r}{v} - t\right)\right] \qquad (15)$$

This indicates that the phenomenon deals with wave packets whose group velocity is as should be expected, the electron velocity:

$$V = (2\hbar\omega)/(\epsilon p) \qquad (16)$$

The amplitude of the wave packets described by Equation (15) varies periodically with the length $r$ of the electron beam between the thin crystal film target and the screen. The peaks of the variation along $r$, as noted from FIG. 2, are separated by equal distances:

$$\tfrac{1}{2}\Lambda = (8\pi\hbar)/(p\epsilon^2) = (8\pi E_o^2)/(p\omega^2\hbar) = (2/\epsilon)^2 \lambda_e \quad (17)$$

$\lambda_e$ being the wavelength of the electron. Using the stated values for $\epsilon = 5.1 \times 10^{-5}$ and $p = 1.24 \times 10^{-17}$ gr cm sec$^{-1}$ and Planck's constant $\hbar = 1.055 \times 10^{-27}$ erg sec, Equation (17) provides a value of $\tfrac{1}{2}\Lambda = 0.82$ cm which is substantially equal to the distance between two peaks as measured on FIG. 2.

With regard to the coherence of the electromagnetic radiation, although complete coherence is not required to achieve the interaction phenomenon, still the efficiency of the interaction is significantly effected so that a fair degree of coherence is necessary to obtain a practically satisfactory interaction. In view of the present state of the art, it would appear that electromagnetic radiation in the range from the ultraviolet to the infrared and microwave regions could be used as well as that in the visible spectrum in devices embodying the present invention. Similarly, the greatest efficiency is achieved when the electrical vector of the radiation is polarized in the same direction as that of particle propagation.

It is also contemplated that particles other than electrons may be used in the present invention by selecting target media and other means with appropriate parameters to fulfill the relationships and conditons as indicated above.

It will therefore be seen that the interaction of the present invention may be accomplished using a variety of particle and electromagnetic energy beams as long as an interaction zone is created which will act to satisfy the conditions defined in Equation (11) for the particular beams selected.

COLOR TELEVISION TUBE

Figure 4:
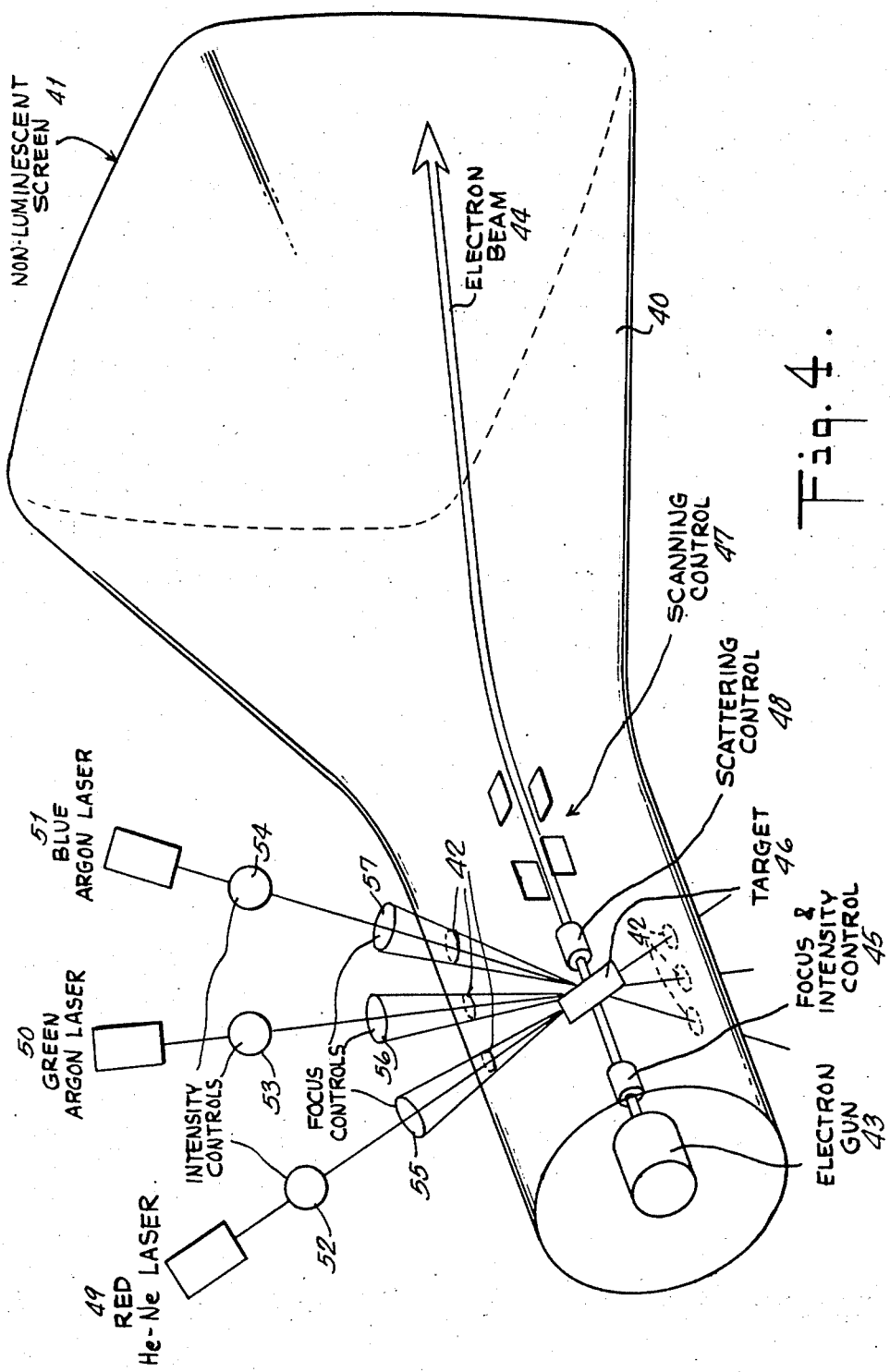
FIG. 4 is a diagrammatic representation of a color television tube incorporating the principles of the present invention.

One particular embodiment utilizing the phenomenon of the present invention is its incorporation in a color television tube, such as shown diagrammatically in FIG. 4. The tube may be constructed substantially in the manner of a conventional black and white television receiver tube and may compromise a glass housing 40 whose interior is evacuated to at least a vacuum level of $10^{-5}$ torr. The exterior of the tube may be coated with an opaque material, with the exception of the front screen portion 41, which should be light transmitting, and the provision of suitable means for permitting passage of the laser beams such as three sets of transparent windows 42, through which the laser light passes into the interior and out of the tube. A conventional electron gun 43, arranged at one end of the tube provides the electron beam 44 which may be focussed by Wehnelt cylinder 45 containing a suitable system for varying the beam intensity. A further electron optic system 47 provides for the producing of an appropriate scanning action of the beam 44 over the display surface or screen 41 of the tube.

The modification of the structure in accordance with the present invention occurs in the region between the intensity and scanning control means 45 and 47. A thin film target 46 is disposed in the path of the electron beam 44 and is of an optically transparent dielectric material, such as monocrystalline or polycrystalline, $SiO_2$, $Al_2O_3$, $SrTiO_4$, $BaTiO_4$ and the like. As the electron beam 44 will tend to be scattered in passing through the target 47, a further system of electron optical lenses 48 may be disposed on the screen side of the target to refocus the beam or, alternatively, a masking diaphragm, such as the tantalum diaphragm used in the first described system, may be used so that only the portion of the beam creating the center spot is used for the scanning operation.

Three lasers, 49, 50 and 51 are appropriately arranged with their beams directed respectively through the three sets of transparent windows 42 and each passing through the thin film target 46. Of course, the number of lasers to be used will depend on the color effects which are to be achieved, so that a single frequency modulated laser may suffice, and, as will be seen, the different colors may be blended as desired. In the usual case, three colors will be used so that a helium-neon laser 49 can be used to produce a red light beam, an argon laser 50 to produce a green light beam and an argon-ion laser 51 to produce a suitable blue light beam.

The intensity of each of the colored beams may be controlled by various appropriate conventional electronic and electro-optical systems, 52, 53 and 54, which are familiar to those skilled in the art. Each beam is focussed by suitable conventional optical lens systems 55, 56 and 57 to pass through the thin film target 47 so as to intersect the electron beam therein and with the direction of its electrical vector aligned with the direction of travel of the electron beam. Means should also be provided for diffusing the three laser beams after passing through the thin film target.

It will be appreciated from the preceding analysis of the phenomenon and the plot in FIG. 2 that the respective points of maximum intensity for the three different colors will occur at different points along the distance r and unless a common and constant value for $\Lambda$ is established for all three colors, the screen would have to be continuously shifted in position to obtain a display at maximum intensity. Accordingly, it will be seen from Equation (17) that the following relationship should be established:

$$\Lambda \approx E_0^2/p\omega^2 \approx E_0 \ \lambda^2 = \text{a constant} \quad (18)$$

where $E_0$ is the electron beam voltage in kilovolts and $\lambda$ is the laser light wavelength in Angstroms. To achieve the desired conditions, the DC accelerating voltage may be impressed with a fast-changing ripple for electron acceleration or three thin films may be used, respectively positioned in accordance with the relationship:

$$\eta = n(\Lambda/2) \quad (19)$$

where $n$ is an integer and $\Lambda$ is a function of the color of the laser light passing through the film.

In operation, the electron may be scanned in the same manner as the beam in a conventional black-and-white receiver tube, so that conventional raster electronics can be used with the electron optics 47. The picture information signal may be fed to the laser intensity control means 52, 53 and 54. Thus, the electron beam may be "modulated" in accordance with the modulation of the three laser beams by the picture signal, so that each illuminated spot on the display surface of the tube may comprise any one or an appropriate mixture of the three colors.

It will readily be seen by those skilled in the art that this system may be easily adapted to use as a color cathode ray tube and in other related color display devices. Also, the system may be used for color coding and decoding electronic signals in data processing and information storage, and in various communications applications.

What is claimed is:

1. Method of creating an interaction between particles and electromagnetic radiation, comprising the steps of:
   a. directing a beam of particles through an interaction zone;
   b. directing a beam of electromagnetic radiation to intersect said particle beam in the interaction zone and with its electrical vector polarized generally in the direction of said particle beam; and
   c. introducing a medium into said interaction zone in the region of beam intersection for allowing momentum transfer among said beams and said medium.

2. Method as in claim 1, wherein said electromagnetic radiation beam is coherent.

3. Method as in claim 1, wherein said electromagnetic radiation beam is at optical frequencies.

4. Method as in claim 1, wherein the particles of said beam are electrons.

5. Method as in claim 1, wherein the particles of said beam are propagating at a given velocity and the speed of light in said medium is approximately equal to said velocity.

6. Method as in claim 1, wherein said medium is transparent to said electromagnetic radiation at the frequency of said radiation.

7. Method as in claim 1, wherein the following relationship is fulfilled:

$$v/c \cos \theta = 1 - (\epsilon/4)$$

wherein $v$ is the particle velocity; $c$ is the speed of light in the medium; $\epsilon$ is the ratio of the energy of the electromagnetic radiation to the energy of the particle and is less than $10^{-1}$; and $\theta$ is the angle between the change in particle momentum and its original direction.

8. Method for producing an electrically controlled color display comprising the steps of:
   a. directing an electron beam through an optically transparent dielectric target;
   b. directing at least one coherent light beam through said target intersecting said electron beam and with its electric vector lying substantially in the direction of said electron beam;

c. scanning said electron beam after passing through said target in a raster pattern on a display surface; and d. controlling said light beam to vary the light produced on said display surface.

9. Method as in claim 8 wherein the intensity of said light beam is varied.

10. Method as in claim 8 wherein the wavelength of said light beam is varied.

11. Method of creating an interaction between a particle beam and a beam of electromagnetic radiation, comprising the steps of:

a. directing the particle beam at a given velocity through an interaction zone containing a medium for decreasing the speed of light in said zone to substantially the velocity of said particle beam; and b. directing the electromagnetic radiation beam to intersect said particle beam in said medium and with its electrical vector polarized generally in the direction of propagation of said particle beam.

12. Apparatus for creating an interaction between particle and electromagnetic radiation comprising:

a. means for producing a beam of particles and directing said beam through an interaction zone;

b. means for producing a beam of electromagnetic radiation and directing said radiation to intersect said particle beam in the interaction zone and with its electrical vector polarized generally in the direction of said particle beam; and c. means in said interaction zone for permitting momentum transfer between said beams.

13. Apparatus as in claim 12, wherein said means in the interaction zone comprises a dielectric which is transparent to radiation at the frequency of said electromagnetic beam.

14. Apparatus as in claim 12, wherein said electromagnetic radiation beam is coherent and at optical frequencies.

15. Apparatus as in claim 12, wherein said particles are electrons.

16. Apparatus as in claim 12, including nonluminescent means for intercepting said particle beam after interaction.

17. Apparatus as in claim 12 wherein the respective means are selected to produce the following relationship:

$$v/c \cos \theta = 1 - (\epsilon/4)$$

wherein $v$ is the particle velocity; $c$ is the speed of light in the medium; $\epsilon$ is the ratio of the energy of the electromagnetic radiation to the energy of the particle and is less than $10^{-1}$; and $\theta$ is the angle between the change in particle momentum and its original direction.

18. Apparatus for creating an interaction between particles and electromagnet radiation comprising:

a. means defining an interaction zone containing a medium for decreasing the speed of light in the zone below that in a vacuum;

b. means for producing a beam of particles with a velocity substantially equal to the speed of light in the zone and for directing said particle beam through said medium;

c. means for producing a beam of coherent electromagnetic radiation and directing said radiation beam through said medium to interact with said particle beam therein and with its electrical vector polarized generally in the direction of said particle beam; and d. means for intersecting said particle beam after passing through said zone.

19. Apparatus for producing an electrically controlled color display comprising:

a. an optically transparent dielectric target;

b. means for producing an electron beam and directing said electron beam through said target;

c. means for producing a coherent light beam and directing said light beam through said target intersecting said electron beam therein and with its electrical vector polarized generally in the direction of said electron beam; and d. means for controlling the propagation of said electron beam after passing through said target.

20. Apparatus as in claim 19 wherein said controlling means is a raster scanning system.

21. Apparatus as in claim 19, wherein said controlling means varies the intensity of the light beam.

22. Apparatus as in claim 19, wherein said controlling means varies the wavelength of the light beam.

23. Apparatus as in claim 19, including non-luminescent means for intercepting said particle beam after passing through said target.

24. Apparatus as in claim 19, including non-fluorescent means for intercepting said particle beam after passing through said target.

25. Apparatus as in claim 19 incorporated in a color television tube.

* * * * *

UNITED STATES PATENT OFFICE
CERTIFICATE OF CORRECTION

Patent No. 3,730,979         Dated May 1, 1973

Inventor(s) Helmut J. Schwarz and Heinrich W. Hora

It is certified that error appears in the above-identified patent and that said Letters Patent are hereby corrected as shown below:

Column 6, equation (3) should read:

$$\psi_+ = e^{\frac{i}{\hbar}\left[(\underline{p} + \underline{\Delta p}_+) \cdot \underline{r} - (E_o + \omega\hbar)t\right]}$$

equation (4) should read:

$$\psi_- = e^{\frac{i}{\hbar}\left[(\underline{p} - \underline{\Delta p}_-) \cdot \underline{r} - (E_o - \omega\hbar)t\right]}$$

equation (6,7) should read:

$$\frac{(\underline{p} \pm \underline{\Delta p}_\pm)^2}{2m} = E_o \pm \omega\hbar$$

equation (8) should read:

$$\psi = \psi_o \left[ a_o + a_+ e^{\frac{i}{\hbar}(\Delta p_+ \cdot \underline{r} - \omega\hbar t)} + a_- e^{-\frac{i}{\hbar}(\Delta p_- \cdot \underline{r} - \omega\hbar t)} \right]$$

Column 7, equation (9) should read:

$$\Delta p_\pm = \frac{1}{2} p(\epsilon \pm \frac{1}{4}\epsilon^2 + \text{-----})$$

line 6, the term reading "5 x 10eV" should read -- $5 \times 10^4$ eV --;

(cont. on following page)

UNITED STATES PATENT OFFICE
CERTIFICATE OF CORRECTION

Patent No. 3,730,979      Dated May 1, 1973

Inventor(s) Helmut J. Schwarz and Heinrich W. Hora

It is certified that error appears in the above-identified patent and that said Letters Patent are hereby corrected as shown below:

(cont. from page 1)

equation (11) should read:

$$\frac{v}{c} \cos \theta = 1 \pm \frac{1}{4} \varepsilon$$

(note "V/c" should read --v/c--)

line 25, the expression reading "V/c" should read --v/c--;

equation (12) should read:

$$(\psi^*\psi) = A_o + 2a_o a_+ \cos\left[\frac{\frac{1}{2}(\varepsilon + \frac{1}{4}\varepsilon^2)pr - \omega\hbar t}{\hbar}\right] +$$

$$+ 2a_o a_- \cos\left[\frac{\frac{1}{2}(\varepsilon - \frac{1}{4}\varepsilon^2)pr - \omega\hbar t}{\hbar}\right] +$$

$$+ 2a_+ a_- \cos\left(\frac{\varepsilon pr - 2\omega\hbar t}{\hbar}\right)$$

UNITED STATES PATENT OFFICE
CERTIFICATE OF CORRECTION

Patent No. 3,730,979          Dated May 1, 1973

Inventor(s) Helmut J. Schwarz and Heinrich W. Hora

It is certified that error appears in the above-identified patent and that said Letters Patent are hereby corrected as shown below:

(cont. from page 2)

equation (13), that portion of the equation reading "A," should read --$A_1$--;

Column 8, equation (16), that portion of the equation reading "V" should read --v--;

Column 9, equation (18), that portion of the equation reading "$E_o$" should read --$E_o^{3/4}$--.

Signed and sealed this 25th day of December 1973.

(SEAL)
Attest:

EDWARD M. FLETCHER, JR.          RENE D. TEGTMEYER
Attesting Officer                 Acting Commissioner of Patents